(12) United States Patent
Chen et al.

(10) Patent No.: US 11,741,630 B2
(45) Date of Patent: *Aug. 29, 2023

(54) VEHICLE SYSTEM WITH NO-CONTROL OPERATION

(71) Applicant: PixArt Imaging Inc., Hsin-Chu County (TW)

(72) Inventors: Chun-Wei Chen, Hsin-Chu County (TW); Shih-Wei Kuo, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,671

(22) Filed: Mar. 4, 2022

(65) Prior Publication Data

US 2022/0198832 A1    Jun. 23, 2022

Related U.S. Application Data

(63) Continuation of application No. 16/880,348, filed on May 21, 2020, now Pat. No. 11,301,678, which is a (Continued)

(30) Foreign Application Priority Data

Jul. 9, 2014    (TW) .................................. 103123744

(51) Int. Cl.
*G06K 9/00*    (2022.01)
*G06T 7/73*    (2017.01)
*B60K 35/00*    (2006.01)
*B60K 37/06*    (2006.01)
(Continued)

(52) U.S. Cl.
CPC ................ *G06T 7/74* (2017.01); *B60K 35/00* (2013.01); *B60K 37/06* (2013.01); *G06F 3/013* (2013.01); *G06F 3/017* (2013.01); *G06F 3/0304* (2013.01); *G06V 10/143* (2022.01); *G06V 20/597* (2022.01); *G06V 40/19* (2022.01); *G06V 40/193* (2022.01); *B60K 2370/149* (2019.05); *B60K 2370/186* (2019.05); *G06F 2203/0381* (2013.01); *G06T 2207/20021* (2013.01); *G06T 2207/30041* (2013.01)

(58) Field of Classification Search
CPC ....................................................... G06F 3/013
See application file for complete search history.

(56) References Cited

U.S. PATENT DOCUMENTS 6,145,107 A * 11/2000 Farokhzad ......... G01R 31/2608
257/355
10,191,480 B2 * 1/2019 He ...................... G01M 99/008
(Continued)

*Primary Examiner* — Hadi Akhavannik
(74) *Attorney, Agent, or Firm* — WPAT, P.C

(57) ABSTRACT

There is provided a vehicle system including a sensing unit, a processing unit, a control unit and a display unit. The sensing unit is configured to capture an image frame containing an eyeball image from a predetermined distance. The processing unit is configured to calculate a pupil position of the eyeball image in the image frame and generate a drive signal corresponding to the pupil position. The control unit is configured to trigger a vehicle device associated with the pupil position according to the drive signal. The display unit is configured to show information of the vehicle device.

20 Claims, 5 Drawing Sheets

Related U.S. Application Data continuation of application No. 16/199,418, filed on Nov. 26, 2018, now Pat. No. 10,699,118, which is a continuation of application No. 15/686,355, filed on Aug. 25, 2017, now Pat. No. 10,192,110, which is a continuation of application No. 14/684,581, filed on Apr. 13, 2015, now Pat. No. 9,805,260.

(51) Int. Cl.
| | | |
|---|---|---|
| *G06F 3/01* | (2006.01) | |
| *G06F 3/03* | (2006.01) | |
| *G06V 40/18* | (2022.01) | |
| *G06V 10/143* | (2022.01) | |
| *G06V 20/59* | (2022.01) | |
| *G06V 40/19* | (2022.01) | |

(56) References Cited

U.S. PATENT DOCUMENTS

| | | | |
|---|---|---|---|
| 11,169,201 B2* | 11/2021 | Degrenne | G01R 31/26 |
| 2005/0077623 A1* | 4/2005 | Roberts | H01L 24/05 |
| | | | 257/E33.059 |
| 2008/0111250 A1* | 5/2008 | Melville | H01L 24/05 |
| | | | 257/E23.141 |
| 2008/0274608 A1* | 11/2008 | Melville | H01L 24/05 |
| | | | 257/E21.575 |
| 2010/0280646 A1* | 11/2010 | Hesse | H01L 22/00 |
| | | | 700/110 |
| 2019/0146032 A1* | 5/2019 | Stine | G06N 3/045 |
| | | | 714/737 |
| 2020/0408830 A1* | 12/2020 | Degrenne | G01R 31/70 |

\* cited by examiner

VEHICLE SYSTEM WITH NO-CONTROL OPERATION

RELATED APPLICATIONS

The present application is a continuation application of U.S. application Ser. No. 16/880,348, filed on May 21, 2020, which is a continuation application of U.S. application Ser. No. 16/199,418, filed on Nov. 26, 2018, which is a continuation application of U.S. application Ser. No. 15/686,355, filed on Aug. 25, 2017, which is a continuation application of U.S. application Ser. No. 14/684,581, filed on Apr. 13, 2015, which claims priority to Taiwanese Application Number 103123744, filed Jul. 9, 2014, the disclosures of which are hereby incorporated by reference herein in their entirety.

BACKGROUND

1. Field of the Disclosure

This disclosure generally relates to a vehicle safety system and, more particularly, to a vehicle safety system and an operating method thereof utilizing pupil detection technique.

2. Description of the Related Art

A car generally has two side view mirrors and one rear view mirror respectively disposed at fixed positions outside and inside of the car. For example, when a driver intends to observe a status of the right rear of the car, he/she has to watch the right side view mirror to observe the status of the right rear of the car. However, when the driver moves his/her head to watch the side/rear view mirror, his/her line of sight is temperately left from a front of the car and the risk of car accident is then increased. To improve driving safety, the related industry provides several kinds of vehicle safety systems to overcome the demerit of the side/rear view mirrors.

In the conventional vehicle safety system, for example, a plurality of parking sensors is disposed at the rear bumper of a car. When a driver puts the car in reverse gear, the plurality of parking sensors detect whether the car is approaching an object, e.g. another car or a wall. When the car is approaching the object, a parking sensor system generates an alert sound to warn the driver. The driver may know a distance between the car and the object according to a variation of the sound (e.g. a variation of frequency).

With the popularity of cameras and display devices, a camera may be further installed at the rear of the car. When the driver puts the car in reverse gear, the parking sensors and the camera are activated simultaneously. Meanwhile, a display device inside the car provides a real time video through the camera. Accordingly, the driver is able to confirm the status behind the car according to the real time video so as to avoid bumping.

Similarly, to ensure driving safety, cameras may be further installed at the side view mirrors of the car to monitor the blind spot of the side view mirrors. However, the display device is generally disposed on the central console inside the car. When the driver intends to confirm the status around the car through the cameras, he/she has to move his/her head to watch the real time video on the display device. At this time, the line of sight of the driver leaves the front of the car and the risk of car accident is also increased.

SUMMARY

Accordingly, the present disclosure provides a vehicle safety system and an operating method thereof utilizing pupil detection technique.

The present disclosure provides a vehicle safety system which tracks a pupil position of a driver to determine whether to trigger a vehicle device and displays information of the vehicle device to the driver.

The present disclosure further provides a vehicle safety system which is able to allow a driver to keep his/her line of sight in front of a vehicle without moving his/her head to watch a side/rear view mirror or a display.

The present disclosure provides a vehicle system. The vehicle system includes a sensing unit, a processing unit and a control unit. The sensing unit is configured to capture an image frame containing an image of an eyeball from a predetermined distance. The processing unit is configured to calculate an eyeball position in the image frame, and generate a drive signal corresponding to at least two separated sub-regions in the image frame at which the eyeball position is located. The control unit is configured to trigger an electronic device in a vehicle according to the drive signal, and stop controlling the electronic device in the vehicle corresponding to other sub-regions in the image frame at which the eyeball position is located.

The present disclosure further provides a vehicle system including a light source, a sensing unit and a processing unit. The light source is configured to project two glints on an eyeball. The sensing unit is configured to capture an image frame containing an image of the eyeball and two glint images, which are located in a transverse direction. The processing unit is configured to calculate an eyeball position in the image frame, trigger an electronic device in a vehicle when the eyeball position is located at a left side or a right side of the two glint images, and stop triggering the electronic device in the vehicle when the eyeball position is located in the region between the two glint images.

The present disclosure provides a vehicle system. The vehicle system includes a sensing unit and a processing unit. The sensing unit is configured to capture an image frame containing an image of an eyeball. The processing unit is configured to divide the image of the eyeball into a first sub-region and a second sub-region surrounding the first region, generate a drive signal to activate an electronic device in a vehicle upon a pupil position is at the second sub-region, and stop controlling the electronic device in the vehicle upon the pupil position is at the first sub-region.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
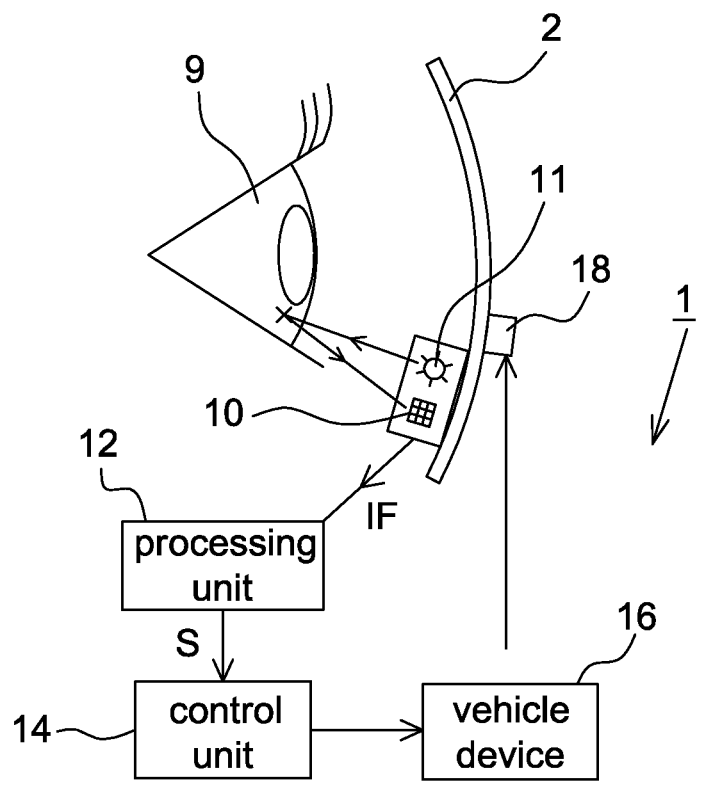
FIG. 1 is a schematic diagram of a vehicle safety system according to a first embodiment of the present disclosure.

FIG. 1 is a schematic diagram of a vehicle safety system 1 according to a first embodiment of the present disclosure. The vehicle safety system 1 is configured to control or activate, according to a pupil position of an eyeball 9, a vehicle device corresponding to the pupil position. The vehicle safety system 1 includes a sensing unit 10, a processing unit 12, a control unit 14, at least one vehicle device 16 and a display unit 18.

The sensing unit 10 is configured to capture an image frame IF containing an eyeball image of the eyeball 9 from a predetermined distance. The sensing unit 10 is, for example, a charge couple device (CCD) image sensor, a complementary metal-oxide semiconductor (CMOS) image sensor or other sensors that are configured to sense light energy.

Generally speaking, when the eyeball 9 looks downward, the eyelid may cover a part of the eyeball 9. Therefore, in some embodiments, if the sensing unit 10 is disposed on a side of eyeglasses 2 facing the eyeball 9 as shown in FIG. 1, a disposed position of the sensing unit 10 is lower than the eyeball 9 such that the vehicle safety system 1 is still able to detect the pupil position through the sensing unit 10 when the eyeball 9 is looking downward.

In some embodiments, the sensing unit 10 may be hung on the eyeglasses 2 or integrated into the eyeglasses 2, but the present disclosure is not limited thereto. In other embodiments, the sensing unit 10 may be disposed on a headwear accessory or a portable device. For example, the sensing unit 10 may be clamped to the brim of a hat so as to capture image frames IF from a substantially fixed predetermined distance.

In addition, when the sensing unit 10 is disposed on the eyeglasses 2 or the headwear accessory worn by a user, the eyeglasses 2 or the headwear accessory moves along with the user's head so that the sensing unit 10 keeps the predetermined distance from the eyeball 9. Therefore, the eyeball 9 is always in a field of view of the sensing unit 10.

The processing unit 12 is, for example, a digital signal processor or other processing devices for processing image data. The processing unit 12 is configured to calculate a pupil position of the eyeball image in the image frame IF and generate a drive signal S corresponding to the pupil position. After the sensing unit 10 captures the image frame IF, the image frame IF is transmitted to the processing unit 12 for image post-processing in a wired or wireless manner. For example, when the sensing unit 10 is disposed on the eyeglasses 2 and the processing unit 12 is disposed inside a vehicle, the sensing unit 10 transmits the image frame IF to the processing unit 12 through a transmission line (e.g. an RS-232 transmission line or a USB transmission line). For convenient using, in some embodiments, the sensing unit 10 transmits the image frame IF to the processing unit 12 in a wireless manner (e.g. Bluetooth or Wi-Fi). Therefore, no matter whether the processing unit 12 and the sensing unit 10 are both disposed on the eyeglasses 2 or not, the processing unit 12 is able to receive the image frame IF from the sensing unit 10.

Although the processing unit 12 shown in FIG. 1 is separated from the sensing unit 10, it is only intended to illustrate but not to limit the present disclosure. In some embodiments, the sensing unit 10 and the processing unit 12 may be integrated in a same chip, i.e. the chip having both functions of image sensing and data processing. For example, the processing unit 12 is a digital signal processing circuit and the sensing unit 10 is a sensing pixel array, and the image frame IF generated by the sensing unit 10 is transmitted to the processing unit 12 for processing through, for example, I2C (Inter-Integrated Circuit). Likewise, in other embodiments, the processing unit 12 has a similar hardware structure to a central processing unit.

Figure 2A:
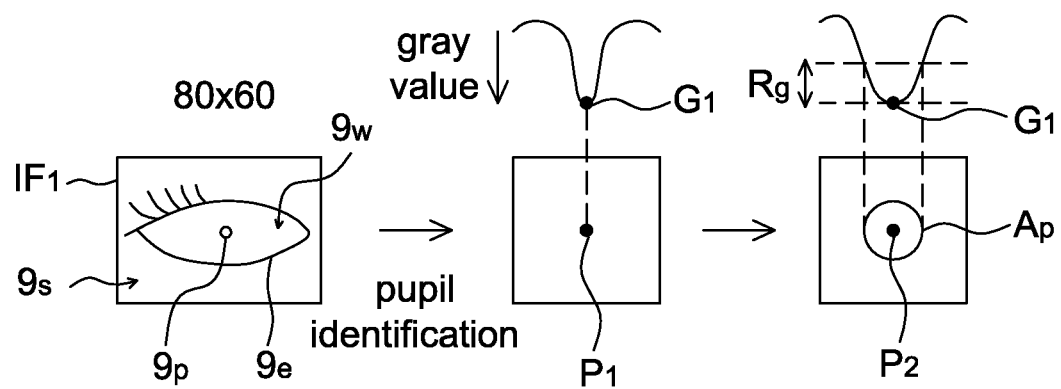
FIG. 2A is a schematic diagram of calculating a pupil position according to an image frame captured by a sensing unit.

Referring to FIGS. 1 and 2A together, FIG. 2A is a schematic diagram of calculating a pupil position according to an image frame $IF_1$ captured by the sensing unit 10. The image frame $IF_1$ contains an eyeball image $9_e$ and an eye surrounding image $9_s$, and the eyeball image $9_e$ includes a pupil image $9_p$ and a white of the eye image $9_w$. In the present disclosure, the processing unit 12 calculates a gray value of each pixel in the image frame $IF_1$ to determine a pupil position accordingly. For example, a resolution of the image frame $IF_1$ is 80×60 (i.e. 4800 pixels), and the processing unit 12 directly determines the pupil position as $P_1$ according to the pixel having a lowest gray value $G_1$ among the pixels.

In some embodiments, the vehicle safety system 1 calibrates the field of view of the sensing unit 10 in advance so that (1) the image frame $IF_1$ captured by the sensing unit 10 may contain less of the eye surrounding image $9_s$ or not contain the eye surrounding image $9_s$; and (2) the eyeball image $9_e$ may be located at a center position of the image frame $IF_1$. Accordingly, accuracy of the processing unit 12 calculating the pupil position is improved.

In one embodiment, since the brightness of the pupil image $9_p$ is lower than that of the white of the eye image $9_w$, the processing unit 12 may determine a pupil position according to a relatively dark region in the image frame $IF_1$. For example, after calculating a position of the lowest gray value $G_1$, the processing unit 12 identifies a plurality of pixels around the lowest gray value $G_1$ and having gray values within a gray value range $R_g$ as a pupil region $A_p$. Then, the processing unit 12 determines the pupil position as $P_2$ according to a gravity center or a center of the pupil region $A_p$. It is appreciated that the pupil position $P_2$ may not be equal to the position corresponding to the lowest gray value $G_1$, e.g. $P_1$. In addition, pixel regions neighboring to the lowest gray value $G_1$ and adjacent to each other may be defined as a same object by using, for example, image grouping technique so as to determine the pupil region $A_p$, wherein the principle of the image grouping is well known, and thus details thereof are not described herein. The calculation method of the processing unit 12 is not limited to those described above. Image processing algorithms that may calculate a pupil position/position of white of the eye through the image frame $IF_1$ are adaptable to the present disclosure.

Figure 2B:
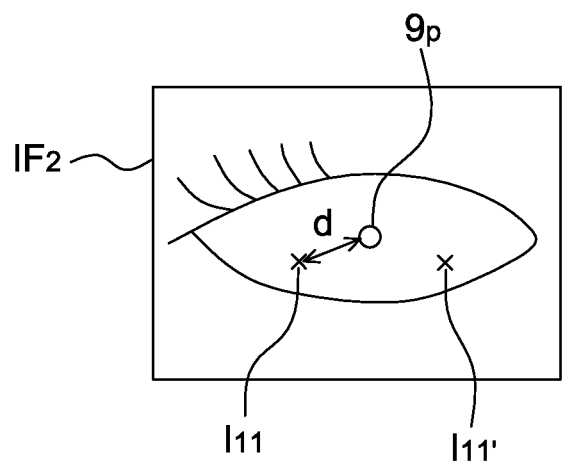
FIG. 2B is a schematic diagram of an image frame captured by a sensing unit.

In addition, the vehicle safety system 1 may further include a light source 11 configured to emit light toward the eyeball 9 to generate at least one glint on the eyeball 9, and the processing unit 12 may determine the pupil positon according to a spatial relationship between a pupil image and at least one glint image in the image frame. More specifically speaking, referring to FIGS. 1 and 2B together, FIG. 2B is a schematic diagram of another image frame $IF_2$ captured by the sensing unit 10, wherein the image frame $IF_2$ contains a pupil image $9_p$ and a glint image $I_{11}$. For example, the pupil image $9_p$ and the glint image $I_{11}$ respectively have a smallest gray value and a largest gray value in the image frame $IF_2$. Then, the processing unit 12 calculates a variation of a relative distance d between the pupil image $9_p$ and the glint image $I_{11}$ in the image frame $IF_2$ to track the pupil and to accordingly determine the pupil position. In addition, the light source 11 may form at least two glint images (e.g. glint images $I_{11}$ and $I_{11}'$) on the eyeball 9, and the processing unit 12 uses a plurality of glint images to calculate the pupil position. The pupil positioning may be referred to, for example, U.S. patent application Ser. No. 14/054,724, entitled "PUPIL DETECTION DEVICE" and assigned to the same assignee of the present disclosure.

It is appreciated that since the sensing unit 10 keeps the predetermined distance from the eyeball 9, and the spatial relationship between the light source 11 and the eyeball 9 is kept unchanged, the glint on the eyeball 9 generated by the light source 11 does not change its position along with the movement of the user's head. Therefore, no matter whether the user's head is moving or not, the glint image $I_{11}$ (or the glint image $I_{11}'$) in the image frame $IF_2$ captured by the sensing unit 10 is defined as a fixed reference point so that the processing unit 12 may calculate the variation of the relative distance d between the pupil image $9_p$ and the glint image $I_{11}$ to track the pupil position accordingly.

The control unit 14 is configured to trigger the vehicle device 16 corresponding to the pupil position according to the drive signal S generated by the processing unit 12, wherein the control unit 14 may be a vehicular computer or be integrated with the processing unit 12. The vehicular device 16 is, for example, a vehicle navigation device, a side view camera or a rear view camera, but not limited thereto.

Figure 3A:
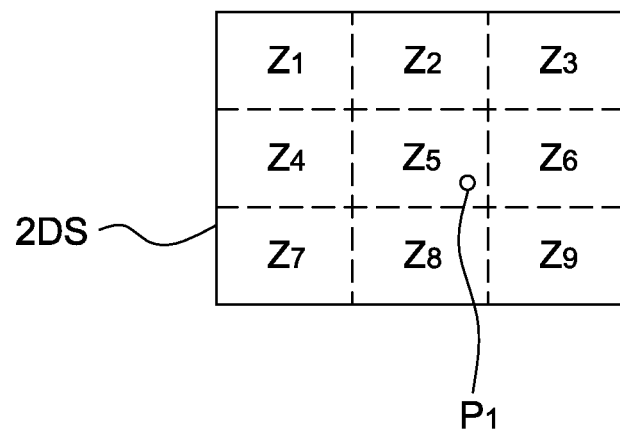
FIG. 3A is schematic diagram of a pupil position and a sub-region of an eyeball image mapped into a two dimensional space.

It should be mentioned that, as shown in FIG. 3A, after calculating the pupil position (e.g. the pupil position $P_1$ in FIG. 2A), the processing unit 12 may map the pupil position $P_1$ and the region of the eyeball image $9_e$ to a two dimensional space 2DS, wherein the two dimensional space 2DS may be divided, for example, into 9 sub-regions $Z_1$-$Z_9$ and each of the sub-regions may or may not correspond to a vehicle device, respectively. Therefore, the processing unit 12 may generate the drive signal S of the vehicle device corresponding to the pupil position $P_1$ according to the sub-region that the pupil position $P_1$ locates. It should be mentioned that the number and arrangement of the sub-regions described above are only exemplary but not to limit the present disclosure.

Finally, when the control unit 14 controls the vehicle device 16 according to the drive signal S, the vehicle device 16 may output information to a display unit for a driver to watch. For example, the vehicle safety system 1 in FIG. 1 further includes a display unit 18 configured to show the information of the vehicle device 16, wherein the display unit 18 may be a micro projection display (e.g. liquid crystal on silicon) disposed on the eyeglasses 2, but not limited thereto. In other embodiments, the display unit 18 may be a liquid crystal display disposed on the vehicle windshield or a head-up display disposed on/above the instrument panel. For ensuring driving safety, in some embodiments, the display unit 18 may be located between a front of the vehicle and the driver (or the eyeball 9) and transparent to visible light.

For example, the sub-regions $Z_1$, $Z_3$, $Z_7$ and $Z_9$ in FIG. 3A respectively corresponds to a vehicle navigation device, a rear view camera, a left side view camera or a right side view camera. When the pupil position $P_1$ enters the sub-region $Z_1$, the drive signal S generated by the processing unit 12 controls the vehicle navigation device. When the pupil position $P_1$ enters the sub-region $Z_3$, the drive signal S controls the rear view camera. When the pupil position $P_1$ enters the sub-region $Z_7$, the drive signal S controls the left side view camera. When the pupil position $P_1$ enters the sub-region $Z_9$, the drive signal S controls the right side view camera. Then, the display unit 18 correspondingly shows information of the vehicle navigation device, the rear view camera, the left side view camera or the right side view camera. Accordingly, the vehicle safety system 1 may control the corresponding vehicle device according to the pupil position of the driver and show information in front of the driver to ensure driving safety.

In one embodiment, information of the vehicle navigation device may be a guidance route, a map or a road condition; and information of the rear view camera, the left side view camera and the right side view camera may be an image or an estimated distance.

It is appreciated that the sub-regions $Z_2$, $Z_4$-$Z_6$ and $Z_8$ in FIG. 3A may not correspond to any vehicle device. For example, when the pupil position $P_1$ stays in one of the sub-regions $Z_2$, $Z_4$-$Z_6$ and $Z_8$, the display unit 18 does not show any information. That is to say, when the pupil position $P_1$ enters the sub-regions $Z_2$, $Z_4$-$Z_6$ or $Z_8$ from the sub-regions $Z_1$, $Z_3$, $Z_7$ or $Z_9$, the display unit 18 then stops showing information corresponding to the vehicle device. In addition, sizes of the sub-regions $Z_1$-$Z_9$ may be optimized through experiment to prevent from disturbing the line of sight of the driver (i.e. to prevent from accidentally triggering a vehicle device).

Apart from mapping the pupil position $P_1$ and the region of the eyeball image $9_e$ to the two dimensional space 2DS, the processing unit 12 may further identify whether the pupil position $P_1$ is to control the vehicle device in other manners.

In one embodiment, when the vehicle safety system 1 includes the light source 11 (as shown in FIG. 1), the image frame $IF_2$ captured by the sensing unit 10 contains the pupil image $9_p$ and the glint images $I_{11}$ and $I_{11}'$ (as shown in FIG. 2B). Then, the processing unit 12 generates the drive signal S according to a relative position between the pupil image $9_p$ (or the pupil position thereof) and the glint images $I_{11}$ and for the control unit 14 to trigger a vehicle device associated with the pupil position according to the drive signal S. For example, when the pupil position is located between the glint images $I_{11}$ and $I_{11}'$, the control unit 14 may not trigger any vehicle device. When the pupil position is not located between the glint images $I_{11}$ and $I_{11}'$ but located at the left side of the glint image $I_{11}$, the control unit 14 may trigger the left side view camera. And, when the pupil position is not located between the glint images $I_{11}$ and $I_{11}'$ but located at the right side of the glint image $I_{11}'$, the control unit 14 may trigger the right side view camera. Accordingly, the display unit 18 of the vehicle safety system 1 may also show information that the driver needs correctly. That is to say, the pupil position described herein may be an absolute position or a relative position.

Figure 3B:
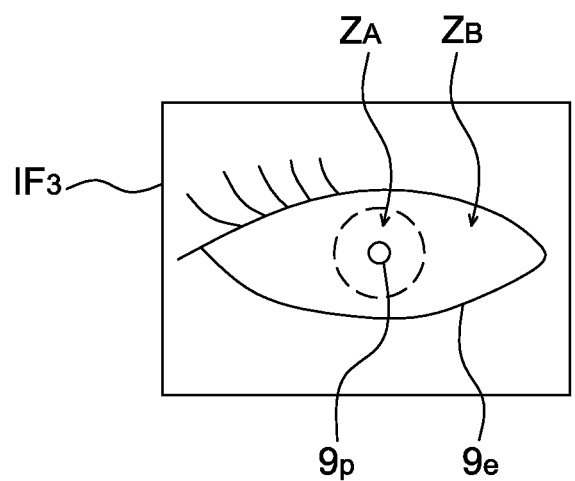
FIG. 3B is a schematic diagram of an eyeball image divided into two sub-regions.

Since the brightness of the pupil is much lower than that of the white of the eye, the brightness of the pupil image $9_p$ is much lower than that of the white of the eye image $9_w$. Therefore, in another embodiment, the eyeball image $9_e$ is divided into at least two sub-regions, e.g. the sub-regions $Z_A$ and $Z_B$ as shown in FIG. 3B, to respectively correspond to different functions, e.g. to control the vehicle device and not to control the vehicle device. The processing unit 12 respectively calculates an average gray value or a summation of gray values of the sub-regions $Z_A$ and $Z_B$ to identify the sub-region that the pupil position locates. For example, when the average gray value of the sub-region $Z_A$ is smaller than that of the sub-region $Z_B$, it means that the pupil position is located at the sub-region $Z_A$, and then the control unit 14 does not control (or stops controlling) the vehicle device according to the drive signal S generated by the processing unit 12, or the drive signal S is not generated by the processing unit 12 when the pupil position is located at the sub-region $Z_A$. When the average gray value of the sub-region $Z_A$ is larger than that of the sub-region $Z_B$, it means that the pupil position is located at the sub-region $Z_B$, and the control unit 14 then controls the vehicle device according to the drive signal S generated by the processing unit 12. It is appreciated that the number and size of the sub-regions are determined according to actual applications.

On the other hand, since the sensing unit 10 may successively capture a plurality of image frames, the processing unit 12 may further identify whether the pupil position is located at a predetermined position for a predetermined time interval, and if so, the drive signal S is then generated. For example, referring to FIG. 3A, it is assumed that the sensing unit 10 captures 5 image frames per second (i.e. a sampling cycle of the sensing unit 10 is 0.2 second), that the predetermined position is the sub-region $Z_9$ corresponding to the right side view camera and that the predetermined time is 1 second. When the pupil position $P_1$ in the first image frame captured by the sensing unit 10 is located at the sub-region $Z_9$, the processing unit 12 does not generate the drive signal S immediately; and when the pupil positions $P_1$ in the second, third, fourth image frames captured by the sensing unit 10 are still at the sub-region $Z_9$, the processing unit 12 does not generate the drive signal S either. The processing unit 12 then generates the drive signal S and the control unit 14 controls the right side view camera correspondingly until the pupil position $P_1$ in the fifth image frame captured by the sensing unit 10 is still located at the sub-region $Z_9$, i.e. the pupil position is located at the predetermined position for the predetermined time interval (0.2×5=1 second).

In addition, the processing unit 12 may further identify blinks according to a plurality of image frames outputted by the sensing unit 10, and generates the drive signal S when identifying the pupil position is at a predetermined position with a predetermined number of blinks. For example, referring to FIG. 3A continuously, it is assumed that the processing unit 12 may not generate the drive signal S immediately when the pupil position $P_1$ enters the sub-region $Z_9$ from the sub-region $Z_5$. After detecting two blinks, the processing unit 12 generates the drive signal S to the control unit 14 to control the right side view camera correspondingly, but the number of blinks is not limited thereto. Therefore, the vehicle safety system 1 may control the vehicle device with a delay time or determine a time that the vehicle device is not controlled according to the pupil position at the predetermined position for the predetermined time interval and/or with the number of blinks.

Figure 4A:
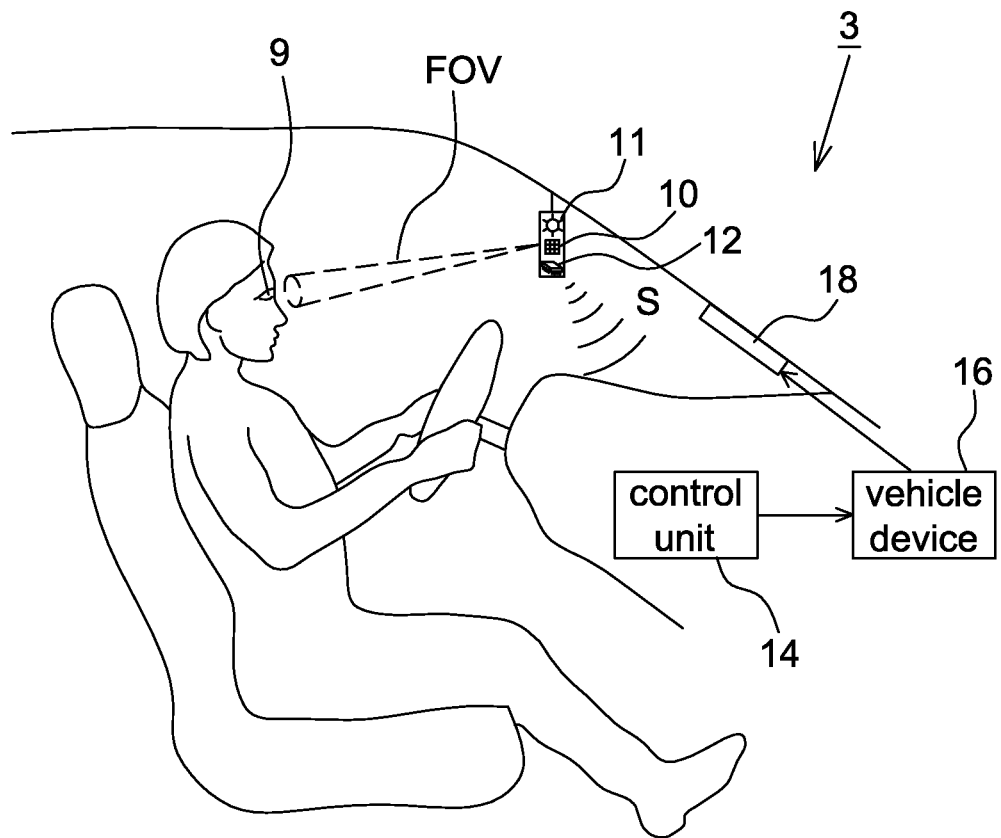
FIG. 4A is a schematic diagram of a vehicle safety system according to a second embodiment of the present disclosure.

FIG. 4A is a schematic diagram of a vehicle safety system 3 according to a second embodiment of the present disclosure. The vehicle safety system 3 is configured to control or activate, according to a pupil position of an eyeball 9, a vehicle device corresponding to the pupil position. The vehicle safety system 3 includes a light source 11, a sensing unit 10, a processing unit 12, a control unit 14, a vehicle device 16 and a display unit 18. In some embodiments, the sensing unit 10 is fixed inside a vehicle, e.g. on a rear view mirror or a car roof inside the vehicle, but not limited thereto. The sensing unit 10 may be disposed on an appropriate position that an eyeball image is successfully captured by the sensing unit 10.

The light source 11 is, for example, an infrared light source such as an IR LED so that the line of sight is not disturbed when the light source 11 is turned on. The light source 11 is configured to emit light toward the eyeball 9 to generate at least one glint on the eyeball 9.

The sensing unit 10 is configured to capture an image frame containing at least one glint image of the at least one glint, wherein the sensing unit 10 captures the image frame with a field of view FOV. Since the sensing unit 10 is farther away from the eyeball 9 (compared with the distance between the sensing unit 10 and the eyeball 9 in the first embodiment), the image frames captured by the sensing unit 10 may contain a part of face image $I_{face}$, as the image frame $IF_4$ shown in FIG. 4B.

The processing unit 12 is, for example, a digital signal processor which is configured to determine an eyeball image range according to the at least one glint image in the image frame, calculate a pupil position according to the at least one glint image and a pupil image in the eyeball image range and generate a drive signal S corresponding to the pupil position accordingly.

Figure 4B:
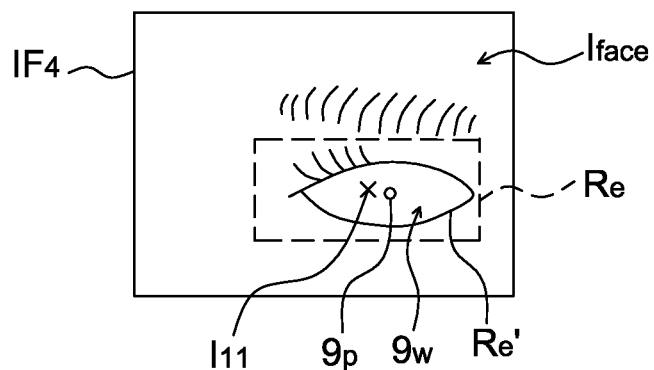
FIG. 4B is a schematic diagram of an image frame captured by a sensing unit.

For example, referring to FIGS. 4A and 4B together, FIG. 4B is a schematic diagram of an image frame $IF_4$ captured by the sensing unit 10. Since the light source 11 generates a glint on the eyeball 9 so that the position corresponding to the glint in the image frame IF4 may be the pixel having the largest gray value (e.g. the glint image $I_{11}$), thus the processing unit 12 may determine an eyeball image range $R_e$ according to the glint image $I_{11}$.

In one embodiment, the eyeball image range $R_e$ may be a predetermined range taking the glint image $I_{11}$ as a center, wherein a shape of the predetermined range may be a rectangle, ellipsoid or circle, but not limited thereto. In addition, since the brightness of the white of the eye image $9_w$ is higher than that of the face image $I_{face}$, thus an eyeball image range $R_e'$ may be determined by comparing gray values. For example, when a difference value between gray values of two adjacent pixels is within a gray value threshold range, the processing unit 12 determines the eyeball image range $R_e'$ according to pixels corresponding to the gray values. It is appreciated that the eyeball image range $R_e$ is larger than the eyeball image range $R_e'$.

After the eyeball image range $R_e$ (or the eyeball image range $R_e'$) is confirmed, the processing unit 12 calculates a pupil position according to the glint image $I_{11}$ and a pupil image (e.g. the pupil image $9_p$ in FIG. 4B) in the eyeball image range $R_e$, and as the calculation method is already described in the first embodiment, details thereof are not described herein.

In one embodiment, the processing unit 12 searches the eyeball image range $R_e$ or $R_e'$ through conventional face recognition technology, and then calculates the pupil position.

The processing unit 12 and the sensing unit 10 in FIG. 4A are shown as two independent elements for description only, but not to limit the present disclosure. As mentioned above, the processing unit 12 may be a digital signal processing circuit, and the sensing unit 10 may be a sensing pixel array and integrated in a same chip.

It should be mentioned that since the sensing unit 10 is farther away from the eyeball 9, even if the eyeball 9 does not leave the field of view FOV of the sensing unit 10 when the user's head moves, a position of the glint image $I_{11}$ in the image frame $IF_4$ captured by the sensing unit 10 may be changed due to the movement of the user's head so that the processing unit 12 is unable to correctly calculate the pupil position. Therefore, in one embodiment, the vehicle safety system 3 firstly identifies whether the user's head is kept unmoved for a predetermined time interval. For example, the processing unit 12 calculates distances between center positions of the eyeball image ranges $R_e$ (or the eyeball images $R_e'$) in a plurality of image frames captured by the sensing unit 10 for the predetermined time interval and identifies whether the distances are smaller than a predetermined value. When the vehicle safety system 3 identifies that the user's head is kept steady for the predetermined time interval, the processing unit 12 then calculates a pupil position according to at least one glint image and a pupil image in the eyeball image range $R_e$ or $R_e'$, and generates a drive signal S corresponding to the pupil position accordingly.

The control unit 14 is disposed inside the vehicle, e.g. a vehicle computer or a vehicle control console, which is configured to trigger the vehicle device 16 associated with the pupil position according to the drive signal S. It is appreciated that since the processing unit 12 is fixed on the rear view mirror and the sensing unit 14 is disposed inside the vehicle, the drive signal S generated by the processing unit 12 may be transmitted to the control unit 14 in a wireless manner, but not limited thereto.

Similarly, the vehicle device 16 is, for example, a vehicle navigation device, a side view camera or a rear view camera. The control unit 14 triggers the vehicle device 16 associated with the pupil position according to the drive signal S so that the display unit 18 may show information of the vehicle device 16.

In addition, similar to the first embodiment of the present disclosure, the processing unit 12 generates the drive signal S when identifying the pupil position is at a predetermined position for a predetermined time interval, or the processing unit 12 identifies blinks according to a plurality of image frames outputted by the sensing unit 10 and generates the drive signal S when identifying the pupil position is at a predetermined position with a predetermined number of blinks.

Figure 5A:
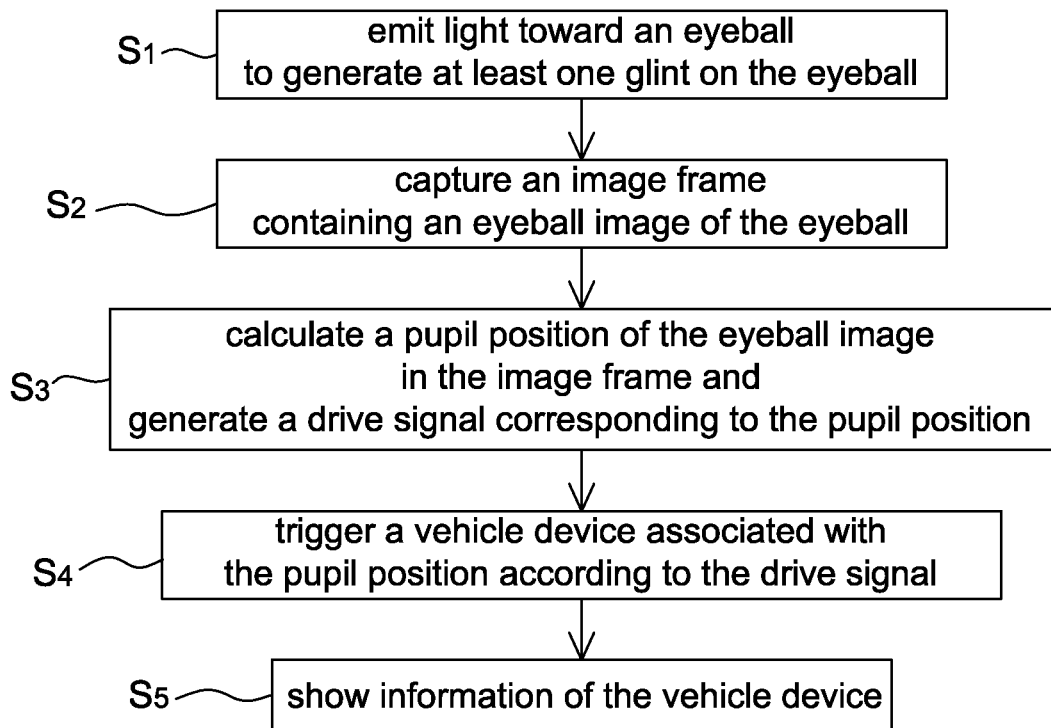
FIG. 5A is a flow chart of an operating method of a vehicle safety system according to one embodiment of the present disclosure.
Figure 5B:
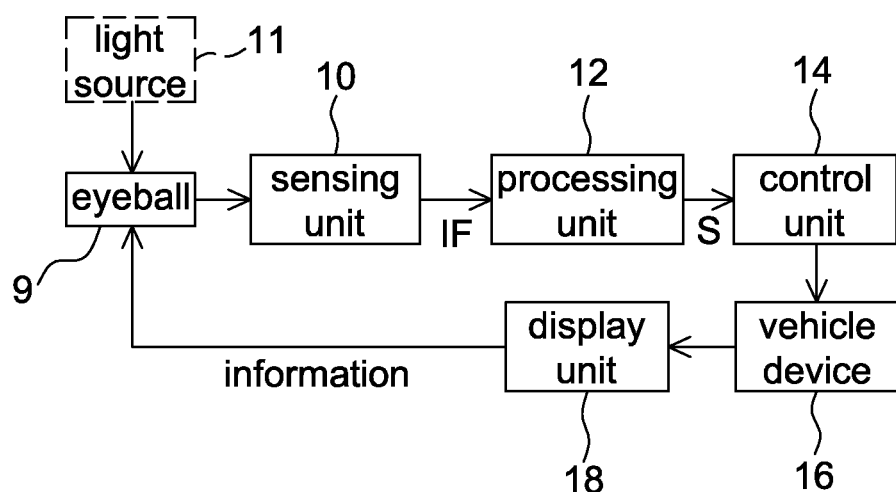
FIG. 5B is a block diagram of an operating method of a vehicle safety system according to one embodiment of the present disclosure.

Referring to FIGS. 5A and 5B together, FIG. 5A is a flow chart of an operating method of a vehicle safety system according to one embodiment of the present disclosure, and FIG. 5B is a block diagram of an operating method of a vehicle safety system according to one embodiment of the present disclosure.

The operating method of the vehicle safety system according to one embodiment of the present disclosure includes the steps of: emitting, by a light source, light toward an eyeball to generate at least one glint on the eyeball (step $S_1$); capturing an image frame containing an eyeball image of the eyeball (step $S_2$); calculating, by a processing unit, a pupil position of the eyeball image in the image frame and generating a drive signal corresponding to the pupil position (step $S_3$); triggering a vehicle device associated with the pupil position according to the drive signal (step $S_4$); and showing, by a display unit, information of the vehicle device (step $S_5$), wherein in the step of calculating a pupil position of the eyeball image in the image frame the pupil position is determined according to a spatial relationship between a pupil position and at least one glint image in the image frame.

It should be mentioned that the light source in the embodiments of the present disclosure is configured to assist the processing unit in calculating the pupil position. Whether the light source is disposed in the vehicle safety system is determined by the method that the processing unit calculates the pupil position.

In the above embodiments, a switch is further provided in the vehicle safety system and configured for the user to activate or deactivate the vehicle safety system. For example, referring to FIG. 1, in one embodiment of the present disclosure, the vehicle safety system 1 may further include a switch (e.g. a touch button) integrated with the eyeglasses 2, and the user determines whether the vehicle safety system 1 starts to track or stops stacking the pupil thereof through the switch. Referring to FIG. 4A, in the second embodiment of the present disclosure, the vehicle safety system 3 may further include a switch (e.g. a physical button) integrated with a steering wheel, and the user determines whether the vehicle safety system 3 starts to track or stops stacking the pupil thereof when holding the steering wheel, but not limited thereto. The switch may also be implemented by detecting a predetermined gesture (e.g. an OK gesture) by the vehicle safety system. For example, in accordance with the second embodiment of the present disclosure, the vehicle safety system 3 further includes a gesture recognition unit inside the vehicle (e.g. on a central console), and the gesture recognition unit identifies whether the user makes the predetermined gesture according to images to activate or deactivate the vehicle safety system 3, wherein the images are captured by the sensing unit 10 or by an image sensor additionally disposed inside the vehicle (e.g. on the central console). The operating method of the gesture recognition unit is well known, and thus details thereof are not described herein. Accordingly, the vehicle safety system in the above embodiments may start to detect or stop detecting according to the control of the switch or gesture so as to prevent control errors.

In the above embodiments, a plurality of vehicle devices may be disposed in one vehicle, and the control unit controls one of the plurality of vehicle devices according to the drive signal generated by the processing unit.

In addition, the operating method of the vehicle safety system of the present disclosure is not limited to be operated with the vehicle safety system. As mentioned above, the present disclosure provides a processing unit that tracks a pupil position of a user through a sensing unit to trigger a device associated with the pupil position, and shows information of the device to the user. Therefore, in some embodiments, the operating method is adaptable to the virtual reality technology, e.g. a head mounted display or a simulator, and correspondingly controls a virtual device according to the pupil position.

For example, referring to FIG. 1 continuously, it is assumed that the vehicle safety system 1 and the eyeglasses 2 is a headwear display; meanwhile, the vehicle device 16 may be a sensor, an input device or other content (e.g. a software program) corresponding to the virtual reality technology. Similarly, the processing unit 12 calculates a pupil position through the image frame captured by the sensing unit 10, and triggers a corresponding virtual reality sensor or content according to the pupil position. The display unit 18 then shows information associated with the pupil position in front of the user so as to implement human-machine interaction in the virtual reality.

For example, referring to FIG. 4A continuously, it is assumed that the vehicle safety system 3 is a driving simulator; meanwhile, the vehicle device 16 may be a plurality of virtual vehicle devices (e.g. a software program), and the processing unit 12 triggers at least one of the plurality of virtual vehicle devices through a calculated pupil position. Then, the display unit 18 shows information of the virtual vehicle device associated with the pupil position, e.g. a side view image or a rear view image, in a full screen, main/sub screen or split screen manner.

It is appreciated that when the operating method of the vehicle safety system is applied to the virtual reality, a host computer may have functions of the processing unit 12, the control unit 14 and the vehicle device 16. That is to say, the processing unit 12, the control unit 14 and the vehicle device 16 may be implemented by software computation through the host computer.

In one embodiment, the vehicle safety system further includes a light source configured to emit light toward the eyeball to generate at least one glint on the eyeball, wherein the processing unit is configured to determine the pupil position according to a spatial relationship between a pupil image and at least one glint image in the image frame.

In one embodiment, the eyeball image is divided into at least two sub-regions respectively corresponding to different functions. The processing unit respectively calculates a gray value of each of the at least two sub-regions to identify the sub-region that the pupil position locates.

In one embodiment, when the processing unit identifies the pupil position is at a predetermined position for a predetermined time interval, the drive signal is then generated.

In one embodiment, the processing unit further identifies blinks according to a plurality of image frames outputted by the sensing unit. When the processing unit identifies the pupil position is at a predetermined position with a predetermined number of blinks, the drive signal is then generated.

The vehicle safety system according to the embodiment of the present disclosure determines whether to trigger a vehicle device by identifying a pupil positon of a driver and shows information of the vehicle device in front of the user. In addition, the vehicle safety system further determines whether to trigger the vehicle device by identifying the pupil positon is at a predetermined position for a predetermined time interval or identifying the pupil positon is at a predetermined position with a predetermined number of blinks so that the driving safety is improved without disturbing the driver's line of sight.

As mentioned above, the conventional vehicle safety system is generally disposed on a car console panel inside the car, and the line of sight of a driver must leave the front of the car when the driver moves his/her head to confirm the status around the car through a display device. Therefore, the present disclosure provides a vehicle safety system (e.g. FIGS. 1 and 4A) and an operating method thereof (e.g. FIG. 5A) that may determine whether to trigger a vehicle device by identifying a pupil position of the driver and show information of the vehicle device in front of the driver so as to improve the driving safety.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A vehicle system, comprising:
   a sensing unit configured to capture an image frame containing an image of an eyeball from a predetermined distance;
   a processing unit configured to
     calculate an eyeball position in the image frame, and
     generate a drive signal corresponding to at least two separated sub-regions in the image frame at which the eyeball position is located; and
   a control unit configured to
     trigger an electronic device in a vehicle according to the drive signal, and
     stop controlling the electronic device in the vehicle corresponding to other sub-regions in the image frame at which the eyeball position is located.

2. The vehicle system as claimed in claim 1, wherein the sensing unit is configured to transmit the image frame to the processing unit in a wired or wireless manner.

3. The vehicle system as claimed in claim 1, wherein
   each of the at least two separated sub-regions corresponds to one of different functions, and
   each of the different functions is configured to control one electronic device in the vehicle.

4. The vehicle system as claimed in claim 1, further comprising a display unit configured to show information of the electronic device in the vehicle.

5. The vehicle system as claimed in claim 1, wherein the processing unit is configured to generate the drive signal when identifying that the eyeball position is at one of the at least two separated sub-regions for a predetermined time interval.

6. The vehicle system as claimed in claim 1, wherein the processing unit is further configured to
   identify blinks according to a plurality of image frames outputted by the sensing unit, and
   generate the drive signal when identifying that the eyeball position is at one of the at least two separated sub-regions for a predetermined number of blinks.

7. The vehicle system as claimed in claim 1, wherein the sensing unit is disposed on eyeglasses, a headwear accessory or a portable device.

8. The vehicle system as claimed in claim 1, wherein the processing unit is further configured to
   identify a pupil image and at least one glint image in the image frame; and
   calculate a relative distance between the pupil image and the at least one glint image to track the eyeball.

9. A vehicle system, comprising:
   a light source configured to project two glints on an eyeball;
   a sensing unit configured to capture an image frame containing an image of the eyeball and two glint images, which are located in a transverse direction;
   a processing unit configured to
     calculate an eyeball position in the image frame,
     trigger an electronic device in a vehicle when the eyeball position is located at a left side or a right side of the two glint images, and
     stop triggering the electronic device in the vehicle when the eyeball position is located in the region between the two glint images.

10. The vehicle system as claimed in claim 9, further comprising a display unit configured to show information of the electronic device in the vehicle.

11. The vehicle system as claimed in claim 9, wherein the processing unit is configured to trigger the electronic device in the vehicle when identifying that the eyeball position is at the left side or the right side of the two glint images for a predetermined time interval.

12. The vehicle system as claimed in claim 9, wherein the processing unit is further configured to
   identify blinks according to a plurality of image frames outputted by the sensing unit, and trigger the electronic device in the vehicle when identifying that the eyeball position is at the left side or the right side of the two glint images for a predetermined number of blinks.

13. The vehicle system as claimed in claim 9, wherein the sensing unit is disposed on eyeglasses, a headwear accessory or a portable device.

14. The vehicle system as claimed in claim 9, wherein the processing unit is further configured to
   identify a pupil image in the image frame, and
   calculate a relative distance between the pupil image and at least one of the two glint images to track the eyeball.

15. A vehicle system, comprising:
   a sensing unit configured to capture an image frame containing an image of an eyeball; and
   a processing unit configured to
      divide the image of the eyeball into a first sub-region and a second sub-region surrounding the first region,
      generate a drive signal to activate an electronic device in a vehicle upon a pupil position is at the second sub-region, and
      stop controlling the electronic device in the vehicle upon the pupil position is at the first sub-region.

16. The vehicle system as claimed in claim 15, wherein the processing unit is further configured to
   identify at least one glint image in the image frame; and
   calculate a relative distance between the pupil position and the at least one glint image to track the eyeball.

17. The vehicle system as claimed in claim 15, wherein the processing unit is configured to generate the drive signal when identifying that the eyeball position is at the second sub-region for a predetermined number of image frames.

18. The vehicle system as claimed in claim 15, wherein the processing unit is further configured to
   identify blinks according to a plurality of image frames outputted by the sensing unit, and
   generate the drive signal when identifying that the eyeball position is at the second sub-region for a predetermined number of blinks.

19. The vehicle system as claimed in claim 15, wherein the processing unit is configured to calculate the pupil position according to gray values of the first sub-region and the second sub-region.

20. The vehicle system as claimed in claim 15, further comprising a display unit configured to show information of the electronic device in the vehicle.

* * * * *